March 21, 1939.  W. J. DOTY  2,150,965
DRIP TRAY FOR PAINT POTS
Filed April 28, 1938
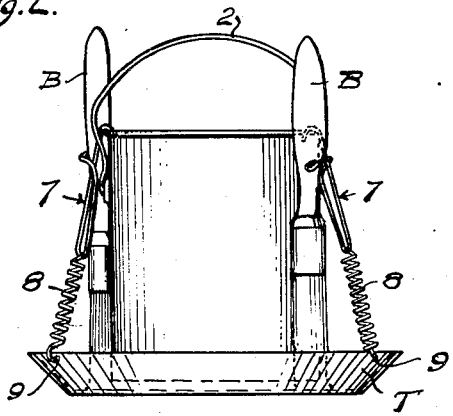
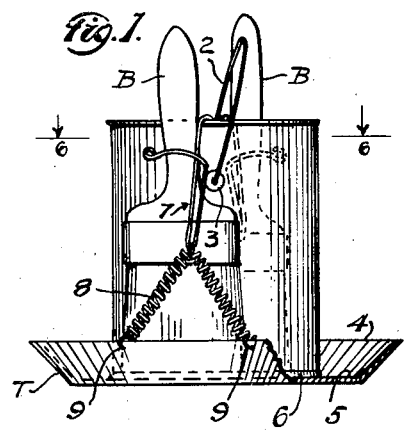
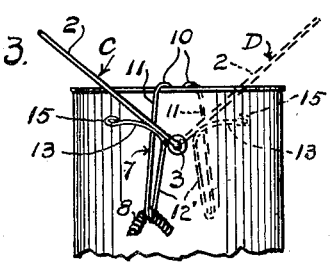
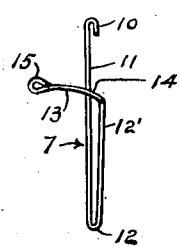
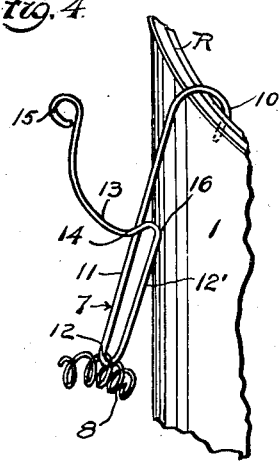
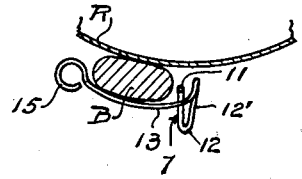
INVENTOR:
William J. Doty,
BY
Harold D. Penney, ATTORNEY.

Patented Mar. 21, 1939

2,150,965

UNITED STATES PATENT OFFICE 2,150,965

DRIP TRAY FOR PAINT POTS

William J. Doty, Staten Island, N. Y.

Application April 28, 1938, Serial No. 204,728

4 Claims. (Cl. 91—66)

The present invention is related to the provision of means for providing a portable and removable paint drip catcher for paint pots, including means for holding wet paint brushes, when not in use, and also for carrying paint brushes thereon and to prevent the ends of the brushes from drying out when laid aside, temporarily, to prevent the paint pot handle or bail from becoming covered with drip, thus to keep the brush handles and bail from becoming covered with paint, to prevent paint from dripping on the floor or elsewhere, and to provide a drip pan having a flared edge spaced from the pot, and which may be removed from one paint pot and mounted on another paint pot, as desired.

The foregoing and other features of advantage will be apprehended as the herein description proceeds, and it will be obvious that modifications may be made in the structure herein without departing from the spirit hereof or the scope of the appended claims.

In the drawing,

Fig. 1 is a view in elevation of the present improvement, with parts broken away to better show the structure;

Fig. 2 is a view, similar to Fig. 1, but turned one quarter way around;

Fig. 3 is a fragmentary, elevational view of the paint pot showing the manner in which the device prevents the bail from falling down and keeps it elevated;

Fig. 4 is an enlarged, fragmentary view of the paint pot, and a perspective view of one of can holding hooks, as applied;

Fig. 5 is a vertical view of one pot hook; and

Fig. 6 is a fragmentary sectional view taken on the line 6—6, Fig. 1, looking in the direction of the arrows.

The paint pot herein illustrated is of the kind that ready prepared paints are sold in, comprising the pot 1, having the usual wire bail or handle 2, pivoted at the journals 3, which are affixed to the paint pot in the usual manner.

The paint pot is provided with a preferably metal drip pan or tray T, upon the inside bottom 5 of which rests the paint pot bottom 6. The tray has an upflared flange 4 all round and acts to catch and collect all drip that may run down the side of the pot during the customary use.

The tray is resiliently and removably attached to the paint pot by means of two hooks, 7—7, which engage over the diametrically opposite edges of the rim R of the paint pot. Mounted on the lower loops 12 of each of said hooks is a coiled spring 8, which attached at its mid-portion to said loop, the divergent ends of said springs being hooked onto the flaring rim 4 of the tray through eyelets or perforations 9, in the tray edge. The perforations 9 are spaced apart, so that the spring ends are divergent in operation forming a triangle the apex of which is caught and held by the hook loop 12, as shown in Fig. 1.

The hook and spring pot attaching assemblies comprise in part, a convoluted wire having a rim engaging hook end 10, Fig. 4, a straight extension 11 extending therefrom to about one half the depth of the pot, the wire then being bent upwardly substantially parallel to extension 11 forming a return extension 12', and forming a spring coil engaging loop 12, over which a coil or two of the mid-section of the length of the coil spring 8 are attached, Fig. 4. The leg extension of the wire is then bent into a loop 16, and a curved extension arm 13 is then bent from loop 16 by a bend 14, to lay across and beyond the extension 11, the terminal of arm 13 terminating in a closed looped end 15. The arm 13, as will be noted in Fig. 6, is so arranged that in laying across extension 11, it forms a resilient brush holding arm, under which the handle B of a brush may be embraced, when the brush is not in use, and is removably held vertically against the pot, when the brush is resting on its bristle end, on the bottom 5 of the tray T, shown in Figs. 1 and 2.

As will be seen in Fig. 3, the curved spring arm 13, is inclined in an upward direction and as shown in Fig. 6, is spaced far enough away from the wall of the paint pot, to act as a barrier to prevent the bail 2 from falling downwardly and thus to rest on the wall of the pot. The bail is thus kept in operative position for easy grasping, and is thus kept clean of paint. Fig. 3 discloses the bail upheld, in full lines at C, by one arm 13, and is shown upheld in dotted position D, by the opposite arm 13, shown dotted. The bail is thus upheld by either opposite arm 13, depending on the random position of release of the bail when the user sets the pot down.

Obviously, the pot engaging hooks 7 are symmetrical, not being formed in either right or left hand embodiments.

In applying the drip catcher to a paint pot the hooks 7 already being attached to the tray, the paint pot is set on the tray and the arms 13 being used as handles are grasped to lift the hooks 7 to strain the springs 8, and the hooks 10 are set over onto the open rim R of the pot. The tension of the springs 8 retains the pot of paint firmly in position in the tray. Thus the arms 13 perform the triple function of acting as brush and bail holders and handles for manipulating the hooks.

When it is desired to keep the brushes temporarily soft over-night, or for a day or so, the tray 4 may be filled with water, or turpentine, so that the tips of the brushes when in the positions shown in Figs. 1 and 2 are kept soft, until further use.

Having thus described the invention, what is claimed is:

1. A paint drip tray for paint pots, in combination with a paint pot and a bail, comprising a flanged tray adapted to support a paint pot thereon, spring coil tray retaining means, convoluted wire hooks adapted to engage over the rim of the pot, means on said hook for engaging the spring coils at their mid-section, the opposite ends of said springs being removably engageable with the flange of said tray and means on said hooks for resiliently and removably holding a paint brush in vertical contact with the side of the paint pot.

2. A paint drip tray, as set forth in claim 1, in which the hook is convoluted to form a pot rim engaging hook end having a straight, downwardly depending extension, a tensional spring engaging loop formed at the lower end of said extension which is bent upwardly to form a straight extension substantially parallel to but spaced away from said first extension to form a return extension, said second extension being then bent into an angular, offset loop which ends in a terminal brush holding arm and handle operating means, said means being spaced away from and crossing both said extensions and located at substantially right angles thereto.

3. A paint drip tray, as set forth in claim 1, in which the spring coils are made in a single length, one for each hook, the outer ends of said coils being tensioned downwardly to engage the flange of said tray at spaced places of engagement thus to form triangular tensioning tray holding means, said last means acting to create a tension for also removably holding said brushes, as described.

4. A paint drip tray as set forth in claim 1, in which the hooks, when in operative pot holding position, are provided with means for operatively holding the bail in an angular position at either side of the vertical center of the pot, as and for the purpose described.

WILLIAM J. DOTY.